United States Patent [19]

Staub, Jr.

[11] 4,296,854
[45] Oct. 27, 1981

[54] FLEXIBLE CLUTCH WITH AN ELASTOMERIC VIBRATION DAMPER

[75] Inventor: Vincent M. Staub, Jr., Dayton, Ohio

[73] Assignee: General Motors Corporation, Detroit, Mich.

[21] Appl. No.: 131,923

[22] Filed: Mar. 21, 1980

[51] Int. Cl.³ .............................................. F16D 3/14
[52] U.S. Cl. .............................. 192/106.1; 192/3.28; 74/411; 64/27 NM; 64/29
[58] Field of Search ................... 192/3.25, 3.28, 3.29, 192/3.3, 3.32, 3.33, 106.1, 106.2; 74/411, 773; 64/27 NM, 29

[56] References Cited

U.S. PATENT DOCUMENTS

| | | | |
|---|---|---|---|
| 2,858,855 | 11/1958 | Picanol . | |
| 3,039,578 | 6/1962 | Peras | 192/106.1 |
| 3,406,583 | 10/1968 | Baier | 74/411 |
| 3,554,045 | 1/1971 | Littmann | 74/411 |
| 3,757,608 | 9/1973 | Willner | 74/411 X |
| 3,788,099 | 1/1974 | Miller | 192/106.1 |
| 3,877,253 | 4/1975 | Yeagle | 64/29 |

FOREIGN PATENT DOCUMENTS 2812716 3/1978 Fed. Rep. of Germany ..... 192/3.25

Primary Examiner—George H. Krizmanich
Attorney, Agent, or Firm—Donald F. Scherer

[57] ABSTRACT

A torque transmitting mechanism has an elastomeric drive mechanism in series with a friction drive mechanism. The elastomeric drive mechanism permits angular excursion between the frictional drive input and the drive mechanism output. To provide this relative motion, an elastomeric belt circumscribes a plurality of cam members which are formed on respective gear members. The gear members are rotatably mounted on the friction drive mechanism and mesh with a gear spline formed in the output member of the drive mechanism. When the torque transmission level is increased, the gears rotate so that the cam members also rotate resulting in an increase in the length of the elastomeric belt thereby increasing the tension therein while permitting the angular excursion between the input and output and simultaneously damping transient torsional vibration.

1 Claim, 2 Drawing Figures

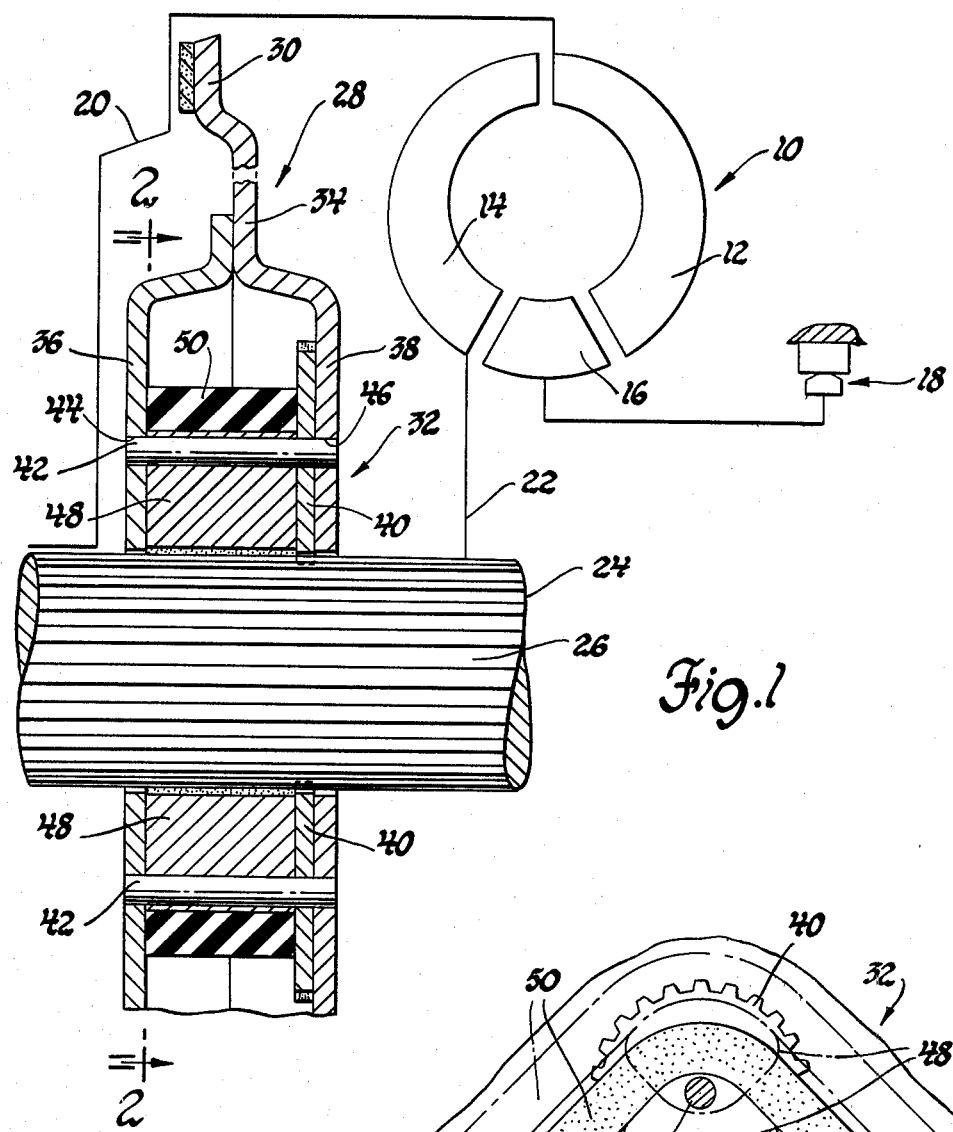
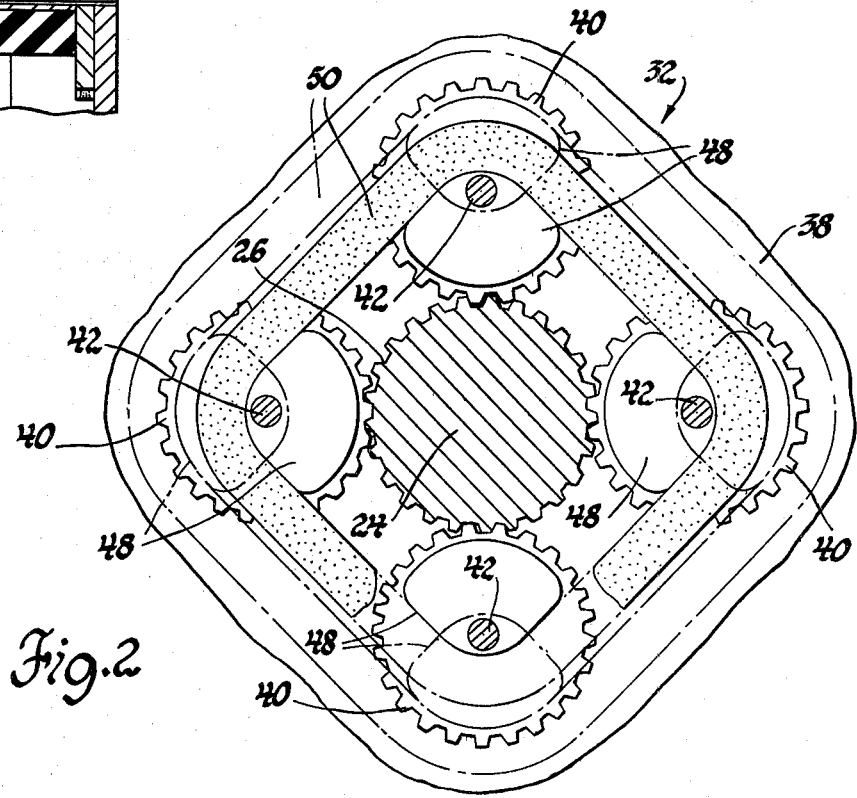

FLEXIBLE CLUTCH WITH AN ELASTOMERIC VIBRATION DAMPER

This invention relates to drive mechanisms and more particularly to drive mechanisms having a resilient drive mechanism in series with a frictional drive mechanism.

It is an object of this invention to provide an improved drive mechanism wherein an elastomeric drive mechansim is arranged in serial drive relationship with a friction drive mechanism such that angular excursion and torsional vibration damping is accomplished within the elastomeric drive mechanism.

It is another object of this invention to provide an improved drive mechanism wherein an elastomeric drive mechanism is arranged in serial drive relationship with a frictional drive mechanism and wherein the elastomeric drive mechanism includes an elastomeric belt member which is operatively connected with the outer surfaces of a plurality of cam members angularly spaced about the output portion of the drive mechanism, and operatively associated with a plurality of gear members which provide a drive mechanism between the elastomeric drive mechanism and the output member.

It is a further object of this invention to provide an improved resilient drive mechanism for use with a frictional drive mechanism wherein the resilient drive mechanism includes a plurality of angularly spaced rotatably mounted gear members which mesh with the output member and each of which have formed thereon a cam member, which cam members are circumscribed by an elastomeric belt such that an increase in torque transmission level through the gear members results in relative angular excursion of the gear members about the output member such that the elastomeric belt member undergoes a change in length enforced by the cam members and accordingly adjusts the torque transmission capacity of the resilient drive mechanism.

These and other objects and advantages of the present invention will be more apparent from the following description and drawings in which:

FIG. 1 is a side elevational view, partly in section of an elastomeric drive mechanism and a diagrammatic representation of a fluid torque converter; and FIG. 2 is a view taken along line 2—2 of FIG. 1.

Referring to the drawings, wherein like characters represent the same or corresponding parts throughout the several views, there is seen in FIG. 1 a torque converter, generally designated 10, having an impeller 12, a turbine 14 and a stator 16. The stator 16 is selectively connected to a transmission housing through a conventional one-way device, generally designated 18. The torque converter 10 is of conventional design and many such devices are currently available in the marketplace. The impeller 12 is drivingly connected to an input shell 20 adapted to be connected to a prime mover, such as an internal combustion engine, not shown. The turbine 14 is drivingly connected through a hub 22 with a torque converter output shaft 24. The output shaft 24 has formed thereon a gear spline surface 26.

Disposed between the input shell 20 and the turbine 14, is a drive mechanism, generally designated 28, which is comprised of a friction clutch 30 and a vibration damper or resilient drive mechanism 32. The friction clutch 30 can be selectively engaged and disengaged with the input shell 20, such that a mechanical drive between input shell 20 and output shaft 24 is provided. The engagement and disengagement of such clutches is well-known and may be seen in U.S. Pat. No. 3,730,315, issued May 1, 1973, to Annis et al., and U.S. Pat. No. 3,252,352, issued May 24, 1966, to General et al. As is well-known with such clutches, when they are fully engaged, a torsional vibration damper is necessary to relieve the transient torsional disturbances emanating from an internal combustion engine. Such torsional vibration damping is provided by the present invention through the resilient drive mechanism 32.

The friction clutch 30 includes a pressure plate 34 which is formed of two members 36 and 38, which cooperate to provide a housing for the resilient drive mechanism 32. The resilient drive mechanism 32 includes a plurality of gear members 40 which are equiangularly spaced around the output shaft 24 between the members 36 and 38. Each member 40 is rotatably mounted on a pin 42 disposed in apertures 44 and 46 formed in members 36 and 38, respectively. The gears 40 mesh with the gear spline surface 26 of output shaft 24.

Secured to each gear member 40, or otherwise integrally formed therewith, is a cam member 48. Each cam member 48 is also rotatably mounted on the respective pin 42. Alternative to the gear and cam structure being rotated on the pin 42, they may be secured to their respective pin members in which case, the pin is rotatably mounted in the members 36 and 38. In any event, relative rotary movement is provided between the gear members 40 and the output shaft 24.

The cams 48 and gears 40 are maintained in the position shown in FIG. 2 by an elastomeric belt 50 which circumscribes the outer surface of the cam members 48. This position is the "at rest" position, wherein no torque is being transmitted through the drive mechanism. That is to say, the friction clutch 30 is disengaged. As will be noted, the cams 48 are disposed radially inward relative to the output shaft 24, such that the maximum eccentricity of each cam member is not in contact with the elastomeric belt 50, as seen in FIG. 2.

When the drive mechanism 28 is engaged, torque is transmitted from the input shell 20 to the friction clutch 30. Torque imposed on the friction clutch 30 is transmitted through the pins 42 to the gears 40. The gears 40 transmit the torque imposed thereon to the output shaft 24. The torque capacity of the gears 40 is determined by the tension in the elastomeric belt 50. If a higher torque level is imposed on the gears 40, they will rotate relative to the output shaft 24 such that the cams 48 will rotate such that the belt 50 will be contacted by a more eccentric portion of the cams 48 to cause an increase in the length of the elastomeric belt 50. This results in increasing the reaction force which the elastomeric belt places on the gears 40. The relative rotation between gears 40 and output shaft 24 will continue until there is sufficient tension in the elastomeric belt 50 to provide the reaction force required to transmit the drive torque. Should a transient or instantaneous torque spike be imposed on the friction clutch 30, this transient torque will be greater than the capacity of the resilient drive mechanism 32. This will result in angular excursion and return of the gear members 40 before the transient torque can be transmitted.

The basic engine output torque can be considered similar to a DC voltage and the transient spikes can be considered similar to AC voltage. As is known in the electrical field, the AC voltage can be filtered out. When the transient torque spikes are imposed on a basic torque output, a solid drive connection will transmit these torque spikes to the output where they are felt by the operator. The resilient drive connection in the present invention permits rapid angular excursion between the input and output members such that the transient torque level is not transmitted and drive line disturbances are greatly reduced. Thus, the transient torque spikes are effectively filtered.

The basic torque level capacity of the resilient drive mechanism 32 is determined by the angular position of cams 48. As the basic torque level increases, the gears 40 will rotate relative to the output shaft 24 which, as previously mentioned, results in elongation of belt 50 through the action of cams 48. This movement establishes the basic torque level of the resilient drive mechanism 32. The transient torque spikes are accommodated by the gears 40 and cams 48 through angular excursion from and return to the position established by the basic torque level.

The embodiments of the invention in which an exclusive property or privilege is claimed are defined as follows:

1. An elastomeric drive mechanism disposed in series with a friction drive mechanism, comprising: an input pressure plate member; an output shaft having a splined exterior; a plurality of gear members rotatably mounted on said pressure plate and meshing with said splined portion of said output shaft, a cam member secured to each of said gear members for unitary rotary movement therewith; and an elastomeric band means operatively connected with and circumscribing the outer portion of said cam members, said gear members providing a drive connection between said pressure plate and said output shaft and said elastomeric band means permitting relative angular excursion between said pressure plate and said output shaft, and said cam members generating increased tension forces within said band means upon increased angular excursion between said pressure plate and said output shaft to provide increased torque capacity in said elastomeric drive mechanism while limiting the transmission of torsional vibrations.

* * * * *